United States Patent [19]

Aitken et al.

[11] Patent Number: 5,246,890
[45] Date of Patent: Sep. 21, 1993

[54] NON-LEAD SEALING GLASSES

[75] Inventors: Bruce G. Aitken, Erwin; Dana C. Bookbinder; Margaret E. Greene, both of Corning; Robert M. Morena, Caton, all of N.Y.

[73] Assignee: Corning Incorporated, Corning, N.Y.

[21] Appl. No.: 924,107

[22] Filed: Aug. 3, 1992

[51] Int. Cl.$^5$ ................................. C03C 8/08
[52] U.S. Cl. ........................................ 501/15; 501/45; 501/46
[58] Field of Search ................. 501/15, 45, 46, 48

[56] References Cited

U.S. PATENT DOCUMENTS

| | | | |
|---|---|---|---|
| 2,400,147 | 5/1946 | Hooley | 252/301.6 |
| 3,407,091 | 10/1968 | Busdiecker | 117/129 |
| 4,314,031 | 2/1982 | Sanford et al. | 501/44 |
| 4,874,724 | 10/1989 | Beall et al. | 501/46 X |
| 4,940,677 | 7/1990 | Beall et al. | 501/45 |
| 5,021,366 | 6/1991 | Aitken | 501/45 |
| 5,071,795 | 12/1991 | Beall et al. | 501/44 |
| 5,089,445 | 2/1992 | Francis | 501/15 |
| 5,089,446 | 2/1992 | Cornelius et al. | 501/15 |
| 5,122,484 | 6/1992 | Beall et al. | 501/15 X |

Primary Examiner—Karl Group
Attorney, Agent, or Firm—M. M. Peterson

[57] ABSTRACT

Lead-free, SnO-ZnO-$P_2O_5$ glasses contain 25-50 mole percent $P_2O_5$ and SnO and ZnO in amounts such that the mole ratio of SnO:ZnO is in the range of 1:1 to 5:1. Optionally, the glasses may contain up to 20 mole percent of modifying oxides including up to 5 mole percent $SiO_2$, up to 20 mole percent $B_2O_3$ and up to 5 mole percent $Al_2O_3$, as well as one or more crystallization promoters selected from 1-5 mole percent zircon and/or zirconia and 1-15 mole percent $R_2O$. The glasses are particularly useful as sealing glass frits in sealing material to join component parts in articles such as cathode ray tubes. The sealing glass material may contain mill additions to reduce the effective coefficient of thermal expansion in a seal.

16 Claims, 1 Drawing Sheet

NON-LEAD SEALING GLASSES

FIELD OF THE INVENTION

SnO-ZnO-$P_2O_5$ glasses used as mid-temperature sealing glass frits, the glass being either vitreous or crystallized in a seal.

BACKGROUND OF THE INVENTION

Joining of component parts together with a fused glass seal to form a composite article is a well cultivated art. In particular, numerous special sealing glasses have been developed for use in joining glass parts with each other, or with metals, alloys, or ceramics.

In making a fusion-type seal, the material must be heated to a temperature where it becomes soft enough to wet the sealing surface and form an adherent, hermetic bond. For many purposes, it is desirable to maintain the sealing temperature as low as possible. This is particularly true in electrical and electronic articles where thermally sensitive parts or coatings are commonly employed.

Accordingly, considerable attention has been given to lead glasses as low temperature sealing glasses. For example, stable sealing glasses, having softening points in the 430°–500° C. range and coefficients of thermal expansion in the 70-90×$10^{-7}$/°C. range, are disclosed in U.S. Pat. No. 2,642,633 (Dalton). Subsequent studies centered on lead-zinc borate type glasses that were subject to thermal devitrification or crystallization. These glasses were intensively investigated in the search for cathode ray tube sealing materials.

For many sealing and coating purposes, glasses are used in powder form, termed glass frits. One such application is forming a seal between the funnel and panel members of a cathode ray tube. Sealing glass frits are commonly mixed with an organic vehicle, such as amyl actate, to form a flowable or extrudable paste. This mixture may then be applied to a sealing surface, e.g., the peripheral rim of a funnel or panel member. It is also known to incorporate mill additions in a glass frit mixture, a primary reason being modification and/or control of the ultimate coefficient of thermal expansion in a seal.

A sealing glass frit for joining cathode ray tube parts, in particular the funnel and panel members, has a number of requirements. The primary requirements are excellent flow of the glass at a maximum temperature of 440°–450° C., and low residual strain in the seal. The latter generally requires a coefficient of thermal expansion (CTE) of about 100×$10^{-7}$/°C.

In addition to flow and expansion compatibility, a sealing glass frit should possess a number of other favorable characteristics. These include good wettability of the glass parts being sealed, solubility in a common industrial solvent for salvage purposes, and compatibility with organic vehicles. In particular, a frit should be compatible with amyl acetate, a vehicle currently used commercially with lead glass frits.

Industrial frit-sealing processes involve a secondary (post-seal) thermal treatment for metallizing, vacuum exhausting or annealing. This second thermal step is generally performed at a lower temperature than is the sealing operation. However, the temperature involved may be high enough to produce viscous deformation of the frit seal. This brings about distortion and misalignment of the sealed assembly. For these reasons, devitrifying frits are utilized which (ideally) permit an extended interval of glassy flow to occur during the initial stages of the sealing step. Thereafter, the frit crystallizes to become a rigid, deformation-resistant material able to withstand and subsequent thermal processing without distortion.

Frits commonly used for sealing cathode ray tubes are lead-zinc borate sealing glasses, both crystallizing and non-crystallizing. These have been used over a long period of time, and have proven very successful. Nevertheless, there has been a continuing desire for a sealing glass frit having all the favorable characteristics of a lead-zinc borate glass, but with a somewhat lower sealing temperature. Furthermore, as a health and safety measure, strenuous efforts are being made to avoid use of lead compounds as far as possible.

Accordingly, a basic purpose of the present invention is to provide a lead-free sealing glass frit. A further purpose is to provide a lead-free glass having characteristics compatible with forming a fusion seal between the funnel and panel members of a cathode ray tube. Another purpose is to provide a means of altering the effective CTEs of the new lead-free glasses to extend their potential utility to sealing components having lower CTEs. Still another purpose is to provide a mid-temperature sealing glass frit capable of forming a fusion seal at a temperature in the range of 400°–450° C. A still further purpose is to provide a lead-free sealing glass frit that forms a crystallized seal, but that retains good flow properties at 450° C. before crystallizing, and that has a CTE on the order of 100×$10^{-7}$/°C.

SUMMARY OF THE INVENTION

The glasses of our invention are lead-free SnO-ZnO-$P_2O_5$ glasses, the compositions of which, as calculated in mole percent on an oxide basis, consist essentially of 25–50% $P_2O_5$ plus SnO and ZnO in amounts such that the mole ratio of SnO:ZnO is in the range of 1:1 to 5:1.

The invention further resides in a sealing material containing as an active ingredient a lead-free, SnO-ZnO-$P_2O_5$ glass frit, the composition of which, as calculated in mole percent on an oxide basis, consists essentially of 25–50% $P_2O_5$ plus SnO and ZnO in amounts such that the mole ratio of SnO:ZnO is in the range of 1:1 to 5:1.

The invention also contemplates a composite article composed of at least two component parts, the parts being joined by a fusion seal; that is, the fused product of a sealing material containing, as an active ingredient, a SnO-ZnO-$P_2O_5$ sealing glass frit, the composition of which, as calculated in mole percent on an oxide basis, consists essentially of 25–50% $P_2O_5$ plus SnO and ZnO in amounts such that the mole ratio of SnO:ZnO is in the range of 1:1 to 5:1.

The invention also embodies a method of producing an at least partially crystallized seal which comprises formulating, mixing and melting a batch for a glass, the glass having a composition consisting essentially of 25–50 mole percent $P_2O_5$ plus SnO and ZnO in amounts such that the SnO:ZnO ratio is in the range of 1:1 to 5:1, and containing at least one crystallization promoter selected from the group composed of 1–5 mole percent zircon and/or zirconia and 1–15 mole percent $R_2O$ ($Li_2O$ and/or $Na_2O$ and/or $K_2O$), producing a sealing glass frit from the melt, forming a sealing material containing the frit, applying the sealing material to a sealing surface and heating in the range of 400°–450° C. for a time sufficient to form a seal with the surface.

PRIOR ART

Attention is directed to the following U.S. patents that disclose zinc phosphate glasses:

U.S. Pat. No. 2,400,147 (Hooley) describes a fluorescent, zinc aluminophosphate glass containing SnO and MnO as fluorescing agents.

U.S. Pat. No. 4,940,677 (Beall et al.) discloses $R_2O$-$ZnO$-$P_2O_5$ glasses that optionally contain numerous oxides, one of which may be up to 35 mole % SnO. The glasses have transition temperatures below 450° C.

U.S. Pat. No. 5,021,366 (Aitken) discloses $R_2O$-$ZnO$-$P_2O_5$ glasses for molded glass lenses. The glasses may contain up to 20 mole % SnO to increase refractive index.

U.S. Pat. No. 5,071,795 (Beall et al.) discloses $R_2O$-$ZnO$-$P_2O_5$ glasses that, optionally contain up to 10 mole percent SnO. The glasses have transition temperatures below 350° C.

The following United States patents disclose sealing glasses and mixtures:

U.S. Pat. No. 3,407,091 (Busdiecker) discloses $R_2O$-$Al_2O_3$-$ZnO$-$P_2O_5$ glasses for sealing metals to metal or glass.

U.S. Pat. No. 4,314,031 (Sanford et al.) discloses tin-phosphorous-oxyfluoride glasses having very low transition temperatures.

U.S. Pat. No. 5,089,445 (Francis) discloses the use of pyrophosphates having the crystalline structure of magnesium pyrophosphate to reduce the effective CTE of lead borate sealing glasses.

U.S. Pat. No. 5,089,446 (Cornelius et al.) discloses mill additions, including the pyrophosphates, to reduce the effective CTEs of the Sanford et al. glasses.

DESCRIPTION OF THE INVENTION

Figure 1:
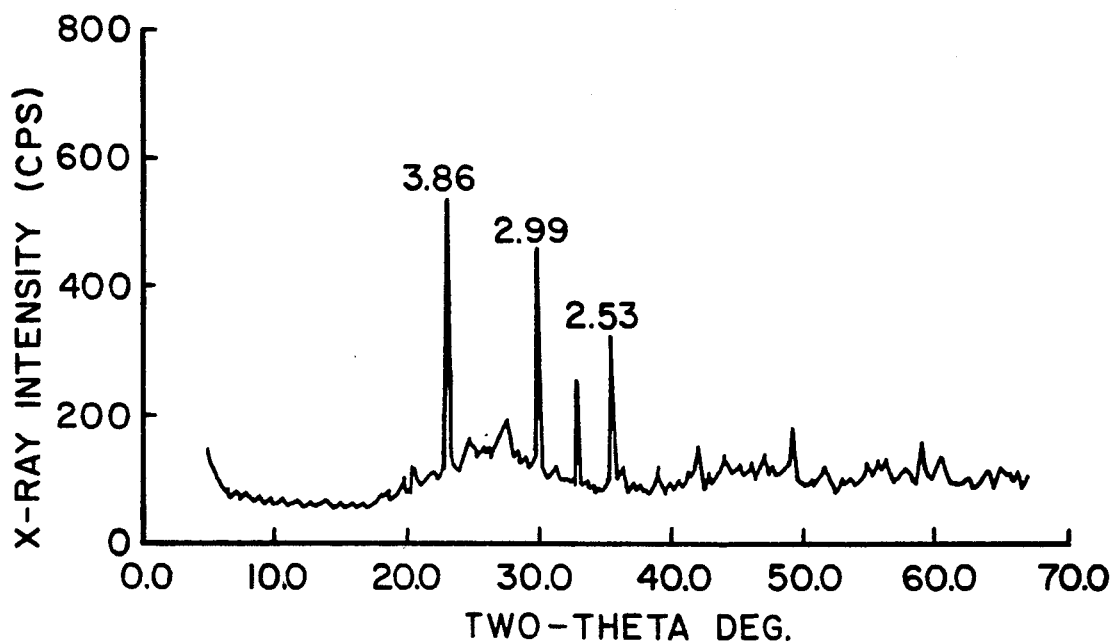
FIG. 1 is a graphical representation of x-ray intensities illustrating a crystallized frit in accordance with the invention.

Our invention is based in large measure on discovery of a family of glasses composed essentially of $P_2O_5$, SnO and ZnO. It is further based on the discovery that these glasses provide highly effective mid-temperature (400°–450° C.) sealing glasses, particularly in frit form. While not limited in their fields of application, these glasses are of particular interest as replacements for the high lead content sealing glasses currently used as mid-temperature sealing glasses. A major feature of the present glasses is their freedom from lead.

The capability of halides, particularly fluorides, to soften a glass, and thus lower its sealing temperature, is well known. Accordingly, our glasses may, optionally, contain up to ten mole percent halide. However, where a product must operate under a vacuum, as in the case of a cathode ray tube, there is concern that such halide-containing glasses may outgas during bakeout. Therefore, for cathode ray tube sealing, it is preferred that they be halide free.

It is also known that the presence of alkali metal oxides ($R_2O$) may soften a glass. Such additives may also improve wettability of a sealing surface. However, they tend to increase the coefficient of thermal expansion and/or lower resistance to weathering. Further, in electrical applications, alkali in a glass may adversely affect electrical properties, and may tend to migrate. Accordingly, while up to fifteen mole percent of $R_2O$ is permissible in our glass, we prefer to have no more than ten mole percent present, and a feature of our glasses is that they may be alkali-free.

Other optional additives include up to about five mole percent $SiO_2$ to lower the coefficient of thermal expansion, up to about twenty mole percent $B_2O_3$, but preferably not over ten, to soften the glass and up to about five mole percent to improve durability. The glasses may also contain up to five mole percent R'O, where R' is one or more of the alkaline earth metals, up to ten mole percent total of one or more of the halogens and up to five mole percent total of one or more of $TiO_2$, $ZrO_2$, and $Nb_2O_5$. The total of all such optional oxide constituents, that is constituents other than SnO, ZnO and $P_2O_5$, should not exceed about 20 mole percent.

A key requirement in the present glasses is that the glass be in a reduced state, that is, the tin be predominantly in the stannous ($Sn^{+2}$) state. To this end, tin is added to a glass batch in stannous form, that is, as black tin (SnO). Alternatively, if light tin ($SnO_2$) is employed, a reducing agent, such as sugar, should be added to insure that a predominant amount of the tin is in a divalent (SnO) state. However, care must be taken not to employ such vigorous reducing conditions that the tin is further reduced to the metal. Where $SnO_2$ is present in substantial amount, a frit appears to crystallize early when heated to sealing temperature. As a result, the frit does not flow and wet the sealing surface as desired for a strong seal.

Good glass formation is obtained with $P_2O_5$ contents ranging from an orthophosphate level, i.e., about 25 mole % $P_2O_5$, to a metaphosphate level, i.e., about 50 mole % $P_2O_5$.

For a frit to use in sealing components, we prefer that the glass contains 29–33 mole percent $P_2O_5$. Lower $P_2O_5$ content frits tend to provide erratic and nonreproducible flow behavior in sealing operations. Frits with higher $P_2O_5$ levels tend to produce all-vitreous seals, that is a seal in which no crystallization occurs. Also, glasses with such higher $P_2O_5$ contents tend to be less durable against chemical attack.

As noted earlier, industrial sealing applications frequently involve subsequent reheating steps. One such application of particular interest is the seal between the funnel and panel members in a cathode ray tube. There the tube may be reheated to a temperature in the 325°–375° C. range in subsequent operations such as bakeout. At such temperatures, an all-glass seal may soften sufficiently so that glass flow occurs, and the tube components undergo misalignment.

This has imposed a requirement for a rigid, crystallized seal that will avoid glass flow during such reheating. This requirement led to studies directed at producing crystallization of our glasses during the sealing steps. More specifically, a delayed crystallization was sought whereby good glass flow characteristics up to 450° C. would be retained prior to full crystallization.

We have found that crystallization of glass frits in the SnO-ZnO-$P_2O_5$ system can be achieved by adding either zircon ($ZrSiO_4$) or zirconia ($ZrO_2$) to the glass batch. Either material, in an amount of 1 to 5 mole %, acts as an internal nucleating agent to promote crystallization. $ZrSiO_4$ is the more effective of the two.

Crystallization may also be obtained by incorporating $R_2O$ in amounts ranging from 1–15 mole %. The alkali metal oxides appear to cause a glass-in-glass phase separation in the precursor glass. This creates sites for nucleation and crystallization.

The alkali metal oxides are less effective in promoting crystallization than either $ZrSiO_4$ or $ZrO_2$. Surprisingly, however, when the alkali metal oxides were added to a $SnO$-$ZnO$-$P_2O_5$ glass together with either $ZrSiO_4$ or $ZrO_2$, the combination provided a higher crystallization yield than did either of the zirconium compounds alone.

A minute amount of powdered platinum, in conjunction with zircon, acts synergistically to produce the highest degree of crystallinity attained in a $SnO$-$ZnO$-$P_2O_5$ glass. However, when platinum is used alone, it does not produce and positive enhancement of crystallinity. The amount of platinum required is very small, and the upper limit is dictated by cost. We find 0.001 up to 0.1 mole % effective.

The combination of platinum and zircon is particularly desirable since it not only gives high crystallinity, but the crystallization process is delayed. Thus, flow buttons for a glass modified with platinum and zircon were heated to 450° C. and held for one hour. Flow occurred during the initial stages of the hold, and the buttons had a glassy appearance that indicated they were completely glassy. Near the end of the hold period, the button surface took on a textured appearance, thus indicating that crystallization had occurred.

The crystallization promoters just noted must be incorporated in the precursor glass by melting; they were ineffective when added as mill additions. Also, other internal nucleating agents, effective in other glasses, were found ineffective to promote crystallization in the present glasses.

Various expedients have been found for further enhancing the degree of crystallization achieved by either of the two methods just described, that is, the addition of zirconium compounds or alkali metal oxides. One such expedient is decreasing the SnO:ZnO molar ratio to as low as 1.8:1. Another is utilizing a $P_2O_5$ content in the 29–30% range. Another is employing a mean particle frit size in the range of 10–20 microns.

Addition of $WO_3$, $MoO_3$ and/or silver metal to a $SnO$-$ZnO$-$P_2O_5$ glass batch has a very beneficial effect on the adherence characteristics of a sealing frit produced from the glass, particularly in seals with a soda-lime-silica glass. The amounts melted in the glass were up to 5 mole % $MoO_3$, up to 5 mole % $WO_3$ and/or 0.10 mole % Ag (corresponding to 5.5 wt. % $MoO_3$, 8.7 wt. % $WO_3$ and 0.08 wt. % Ag metal).

Stable glasses form over a wide range of SnO/ZnO molar ratios. For consistent freedom from devitrification during glass melting and cooling, we prefer a ratio in the range of 1:1 to 5:1. For optimum flow and durability characteristics in a seal, a range of 1.7:1 to 2.3:1 is preferred. The ratios are on a mole percent basis.

When the present glasses are sintered in frit form to simulate seals, coefficients of thermal expansion are generally in the range of $95$–$115 \times 10^{-7}/°C$. These values are obtained whether the sintered body is all-glassy or in partially crystallized form.

The best flow was obtained for all-glass compositions, or for frits composed of glass and an unknown crystalline phase. The latter is characterized by a maximum peak of 3.86 Å as shown by X-ray diffraction (XRD). This particular compound readily formed over $P_2O_5$ levels from 25 to about 33 mole percent $P_2O_5$. Undesirable flow occurred in frits where a second crystalline phase was present (XRD max. peak of 3.41 Å). The 3.41 Å phase presumably occurred as a secondary crystallization product, and interfered with the extended interval of glassy flow needed in the frit for sealing.

The undesirable 3.41 Å phase occurred inconsistently in frits over the $P_2O_5$ range 25–28 mole percent; its presence appeared to be sensitive to $Sn^{+2}/Sn^{+4}$ ratio. This phase was seldom observed at $P_2O_5$ levels at and above about 29 mole percent. Attempts were made unsuccessfully to synthesize either the "good" 3.86 Å phase, or the "bad" 3.41 Å phase, by reacting Zn-metaphosphate glass with various mixtures of SnO and $SnO_2$ for extended times at 400°–600° C.

Initial evaluation confirmed the excellent 440° C. flow, and good expansion compatibility with a commercial funnel glass, of the $SnO$-$ZnO$-$P_2O_5$ frits. In addition, the frits were reported to have acceptable physical and chemical capability with amyl acetate, and were observed to have good wettability with cathode ray tube glasses. Finally, fired samples of the frit/amyl acetate paste had very acceptable levels of electrical leakage (measured amperage $<0.1$ nA) in conductance tests.

The invention is further described with reference to TABLE I which records a group of glass compositions that illustrate the invention. The coefficient of thermal expansion (CTE) is the average expansion change between room temperature and 250° C. The value shown is multiplied by $10^{-7}/°C$. for the actual mesured value. The strain point (St. Pt.) and annealing point (An. Pt.) are in °C. The quality of glass flow in a seal made at 450° C. is shown. The abbreviation Ex. shows excellent flow.

The compositions in TABLE IA are in terms of mole percent on the oxide basis as calculated from a glass batch. Corresponding compositions in terms of parts by weight are presented in TABLE IB. Since these compositions approximate 100, they may be taken as percentages. TABLE IC records relevant properties on glasses having the recorded compositions.

As explained earlier, tin must be present predominantly in the stannous (+2) form. However, it is customary to report tin calculations as $SnO_2$, and that practice is adopted here. It will be appreciated that this may create a discrepancy up to about ten percent in tin oxide values depending on the degree of reduction.

TABLE IA

|  | (mole %) | | | | | | |
|---|---|---|---|---|---|---|---|
|  | 1 | 2 | 3 | 4 | 5 | 6 | 7 |
| $P_2O_5$ | 33.0 | 31.3 | 31.3 | 30.3 | 47.5 | 27.5 | 30.0 |
| ZnO | 22.3 | 22.6 | 22.6 | 21.9 | 19.4 | 24.2 | 18.9 |
| $SnO_2$ | 44.7 | 45.3 | 45.4 | 43.9 | 33.1 | 48.3 | 51.1 |
| $Al_2O_3$ | — | 0.8 | — | — | — | — | — |
| $TiO_2$ | — | — | 0.7 | — | — | — | — |
| $B_2O_3$ | — | — | — | 3.8 | — | — | — |

|  | (mole %) | | | | | | |
|---|---|---|---|---|---|---|---|
|  | 8 | 9 | 10 | 11 | 12 | 13 | 14 |
| $P_2O_5$ | 31.3 | 31.2 | 29.0 | 33.3 | 30.0 | 33.3 | 33.3 |
| ZnO | 20.8 | 22.6 | 20.9 | 23.3 | 20.0 | 28.3 | 31.3 |
| $SnO_2$ | 45.7 | 45.2 | 41.9 | 33.3 | 45.0 | 33.3 | 33.3 |
| CuO | 2.0 | — | — | — | — | — | — |
| CaO | — | 0.5 | — | 10.0 | — | 2.5 | — |
| BaO | — | — | — | — | — | 2.5 | — |
| SrO | — | 0.5 | — | — | — | — | — |
| $Al_2O_3$ | — | — | 0.7 | — | — | — | — |
| $WO_3$ | — | — | — | — | 5.0 | — | — |
| $Nb_2O_5$ | — | — | — | — | — | — | 2.0 |

TABLE IA-continued

| | | | | | | | |
|---|---|---|---|---|---|---|---|
| Cl | — | — | 5.6 | — | — | — | — |
| F | — | — | 1.9 | — | — | — | — |

TABLE IB

| | \(wt %\) | | | | | | |
|---|---|---|---|---|---|---|---|
| | 1 | 2 | 3 | 4 | 5 | 6 | 7 |
| $P_2O_5$ | 35.4 | 33.6 | 33.7 | 33.1 | 50.7 | 29.7 | 31.6 |
| ZnO | 13.7 | 14.0 | 14.0 | 13.8 | 11.9 | 15.0 | 11.4 |
| $SnO_2$ | 50.9 | 51.8 | 51.9 | 51.0 | 37.5 | 55.3 | 57.1 |
| $Al_2O_3$ | — | 0.6 | — | — | — | — | — |
| $TiO_2$ | — | — | 0.5 | — | — | — | — |
| $B_2O_3$ | — | — | — | 2.1 | — | — | — |

| | (wt %) | | | | | | |
|---|---|---|---|---|---|---|---|
| | 8 | 9 | 10 | 11 | 12 | 13 | 14 |
| $P_2O_5$ | 33.8 | 33.6 | 31.4 | 38.8 | 30.8 | 37.7 | 36.9 |
| ZnO | 12.8 | 14.0 | 12.7 | 15.5 | 11.8 | 18.3 | 19.8 |
| $SnO_2$ | 52.1 | 51.8 | 47.9 | 41.1 | 49.0 | 39.9 | 39.1 |
| CuO | 1.2 | — | — | — | — | — | — |
| CaO | — | 0.2 | — | 4.6 | — | 1.1 | — |
| BaO | — | — | — | — | — | 3.1 | — |
| SrO | — | 0.4 | — | — | — | — | — |
| $Al_2O_3$ | — | — | 0.6 | — | — | — | — |
| $WO_3$ | — | — | — | — | 8.4 | — | — |
| $Nb_2O_5$ | — | — | — | — | — | — | 4.1 |
| Cl | — | — | 5.6 | — | — | — | — |
| F | — | — | 1.9 | — | — | — | — |

TABLE IC

| | 1 | 2 | 3 | 4 | 5 | 6 |
|---|---|---|---|---|---|---|
| CTE (RT-250) | 104.2 | 100.8 | 101.9 | 95.9 | — | — |
| St. Pt. (°C.) | 257 | 283 | — | 316 | — | — |
| An. Pt. (°C.) | 278 | 304 | — | 332 | — | — |
| Flow (450° C.) | Ex. | Ex. | Ex. | Good | Ex. | Ex. |

| | 7 | 8 | 9 | 10 |
|---|---|---|---|---|
| Flow (450° C.) | Ex. | Ex. | Ex. | Ex. |

Glass batches based on these compositions were prepared from readily available raw materials. These included ammonium phosphate, zinc oxide and black tin (SnO). Other materials, capable of yielding the oxide, may be employed as desired. For example, ammonium phosphate might be replaced in whole or in part by phosphoric acid ($H_3PO$). Also, light tin ($SnO_2$) with sugar, or stannous pyrophosphate ($Sn_2P_2O_7$), might be used as the source of stannous oxide (SnO).

The glass batches were ball-milled to obtain homogeneous mixtures, and then introduced into covered silica crucibles. Each batch was melted at temperatures in the range of 900°–1000° C. for 2–4 hours. The melts were poured between steel rollers to be quenched into flakes. The flakes were collected and ball-milled to a powder frit having a mean particle size of about 20 microns. Each composition was evaluated in frit form, since data, such as viscosity or expansion data, obtained on a bulk glass are often not relevant in predicting frit behavior.

TABLE II sets forth a series of $SnO$-$ZnO$-$P_2O_5$ glass compositions showing various additives intended to promote crystallization. TABLE IIA shows the compositions in moles, while TABLE IIB shows the same compositions in parts by weight. The contents shown for the basic components ($SnO_2$, $P_2O_5$ and ZnO) total approximately 100 in each composition. The additives are in excess, then.

TABLE IIA

| | (mole %) | | | | | |
|---|---|---|---|---|---|---|
| | 15 | 16 | 17 | 18 | 19 | 20 |
| $P_2O_5$ | 31.5 | 31.5 | 31.5 | 30.3 | 29.5 | 31.5 |
| ZnO | 22.8 | 22.8 | 22.8 | 24.7 | 23.5 | 22.8 |
| $SnO_2$ | 45.7 | 45.7 | 45.7 | 45.0 | 41.0 | 45.7 |
| $Li_2O$ | — | — | 1.5 | 1.5 | 3.0 | 1.5 |
| $Na_2O$ | — | — | 1.5 | 1.5 | 3.0 | 1.5 |
| $ZrSiO_4$ | — | 2.0 | 1.5 | 1.5 | — | — |
| $ZrO_2$ | — | — | — | — | — | 1.5 |
| XRD Peak Height | | | | | | |
| 3.86Å | 0 | 276 | 365 | 454 | 267 | 199 |
| 2.99Å | 0 | 225 | 237 | 342 | 185 | 156 |
| 2.53Å | 0 | 166 | 193 | 240 | 137 | 117 |

TABLE IIB

| | (wt %) | | | | | |
|---|---|---|---|---|---|---|
| | 15 | 16 | 17 | 18 | 19 | 20 |
| $P_2O_5$ | 33.8 | 33.8 | 33.8 | 31.8 | 34.2 | 33.8 |
| ZnO | 14.0 | 14.0 | 14.0 | 14.9 | 15.5 | 14.0 |
| $SnO_2$ | 52.1 | 52.1 | 52.1 | 50.2 | 50.3 | 52.1 |
| $Li_2O$ | — | — | 0.3 | 0.3 | 1.5 | 0.7 |
| $Na_2O$ | — | — | 0.7 | 0.7 | 1.5 | 0.7 |
| $ZrSiO_4$ | — | 2.7 | 2.0 | 2.0 | — | — |
| $ZrO_2$ | — | — | — | — | — | 0.9 |

Glass batches were formulated, mixed, and melted as described earlier. The glasses thus prepared were quenched to provide broken glass that was ground to provide frits of about 20 micron size. Each frit was packed in a mold and dry pressed to form flow buttons 0.5 inches in original diameter. These buttons were placed on a refractory base and subjected to a standard sintering schedule of 450° C. for one hour. For preliminary screening, the degree of flow was visually determined from the condition of the sintered buttons.

Further portions of each glass frit were pressed into bars which were sintered on the same schedule as the buttons. Both the buttons and the bars were examined by XRD. In most instances, a single unidentified crystal phase was obtained with major XRD peaks at 3.86 Å, 2.99 Å and 2.52 Å. This was determined to be a Sn-Zn phosphate compound, but not identified as to crystal type. The XRD peak intensities observed (in counts/second) are shown in TABLE IIA under the term XRD Peak Height. The relative magnitudes of the peak intensities give a rough comparison of crystallization potential. As the data indicate, the greatest potential, and hence greatest amount of crystallinity observed, was in the glass of Example 14. In this example, zircon and alkali metal oxides were added, and a relatively low $P_2O_5$ content and SnO/ZnO ratio were employed.

Figure 2:
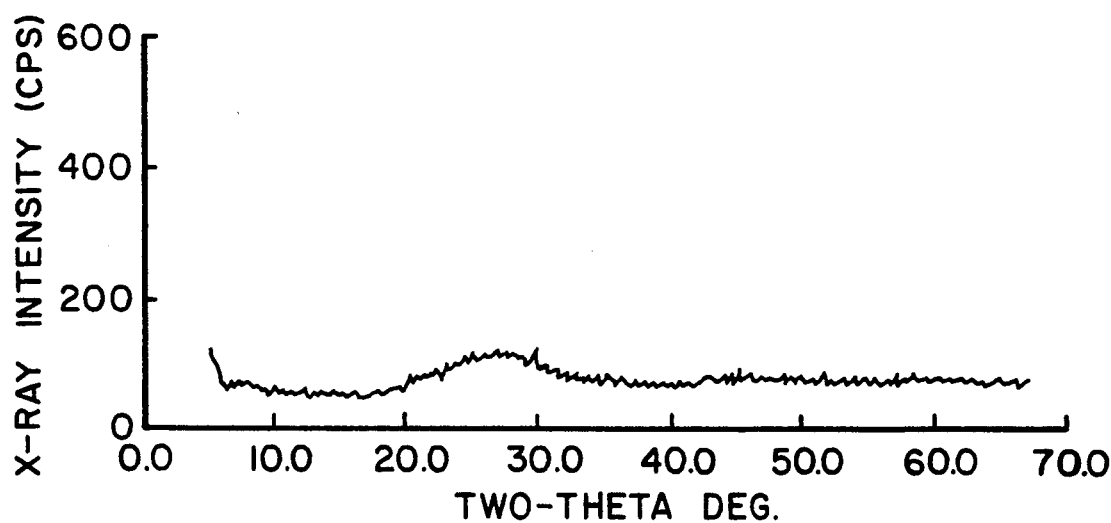
FIG. 2 is a similar graphical representation illustrating a comparative uncrystallized frit in accordance with the invention.

FIG. 1 in the drawing shows an XRD analysis of the sintered frit of EXAMPLE 18. In this drawing, the dominance of the three peaks is apparent. FIG. 2 shows the trace for a sintered frit of the base glass, Example 15 of TABLE II. This trace is devoid of any peak, characteristic of no crystallinity in the sample. In the drawing, X-ray intensity in counts per second is plotted on the vertical axis, and diffraction angle in degrees two-theta (for copper radiation) is plotted on the horizontal.

The good flow of the inventive frits at 440° C. renders them especially attractive for use as sealing frits for cathode ray tube production. The linear coefficients of thermal expansion of the cathode ray tube glass parts being sealed may be below the 95–115×10⁻⁷/°C. values exhibited by the sealing frits of the invention. If so, this may be remedied by low expansion mill additions.

One especially advantageous material for use as a mill addition is B-quartz solid solution. Crystals of this material exhibit a CTE value in the vicinity of zero. The dramatic effect of this material is seen from a test on which 5% and 10% by weight mill additions were made to a glass frit having the composition of Example 1 in TABLE I. This addition changed an actual CTE of $104.2 \times 10^{-7}/°C$. to effective values of $95.8 \times 10^{-7}/°C$. and $84.2 \times 10^{-7}/°C$., respectively.

The source of $\beta$-quartz solid solution crystals utilized in this work comprised particles having diameters averaging about 20 microns. These resulted from ball-milling pieces of a glass-ceramic cookware marketed by Corning Incorporated, Corning, New York under the trademark VISIONS®. The glass-ceramic material, the composition of which is encompassed within U.S. Pat. No. 4,018,612 (Chyung), is greater than 90% by volume crystalline. $\beta$-quartz solid solution constitutes essentially the sole crystal phase.

Other mill additions, well known to the art for lowering the expansion coefficients of sealing frits, such as cordierite and zircon, can be incorporated into the inventive frits. However, about 15-30% of those materials is required to reduce the expansion coefficient to the desired range. This amount exerts an adverse effect upon the flow of the frit. Accordingly, mill additions operable in the inventive frits will exhibit very low linear coefficients of thermal expansion, such that no more than about 15% by weight need be added. Such materials include $\beta$-spodumene solid solution, Invar alloy (64% iron/36% nickel), $\beta$-eucryptite solid solution, fused quartz and VYCOR® brand 96% $SiO_2$ glass.

Pyrophosphate crystalline materials having the crystalline structure of magnesium pyrophosphate are described as mill additions exhibiting low coefficients of thermal expansion in U.S. Pat. No. 5,089,445 (Francis). The pyrophosphate mill additions disclosed therein contain at least one cation selected from the group consisting of magnesium, aluminum, arsenic, cobalt, iron, zinc, and zirconium.

It has been found that these pyrophosphate materials also effectively reduce the expansion coefficient in the present glasses. They are particularly desirable to use because relatively small additions may provide sealing mixtures adapted to use with relatively low expansion materials. These include alumina with a coefficient of expansion of about $65 \times 10^{-7}/°C$., borosilicate glasses with coefficients on the order of $35-55 \times 10^{-7}/°C$. and silicon with an expansion of $40 \times 10^{-7}/°C$.

When used as a mill addition, a pyrophosphate should have a particle size between 10 and 25 microns. Below 10 microns, the inversion, which effects the decrease in effective CTE, does not occur. Above 25 microns, there is a tendency for cracks to develop in a seal. This can be alleviated to some degree by adding Invar in powder form.

A typical example is a sealing material for sealing to alumina. This was prepared by dry mixing 10 grams of the glass of Example 1 with 0.8 grams of Mg Co $P_2O_7$ and 3.0 grams of Invar powder. The sealing material was applied to a glass having the expansion characteristics of alumina. The material was heated at 430° C. to melt the glass and prepare a seal. A polarimeter measurement showed an expansion match between the fusion seal and the glass from the glass Tg down to room temperature.

We claim:

1. A lead-free, $SnO-ZnO-P_2O_5$ glass, the composition of which, as calculated in mole percent on an oxide basis, consists essentially of 25-50% $P_2O_5$ plus SnO and ZnO in amounts such that the mole ratio of SnO:ZnO is in the range of 1:1 to 5:1.

2. A phosphate glass in accordance with claim 1 wherein the glass composition additionally contains at least one modifying oxide selected from the group consisting of up to 5 mole % $SiO_2$, up to 20 mole % $B_2O_3$ and up to 5 mole % $Al_2O_3$, the total of such modifying oxides being not over 20 mole percent.

3. A phosphate glass in accordance with claim 1 wherein the $P_2O_5$ content is 29-33 mole percent.

4. A phosphate glass in accordance with claim 1 wherein the SnO:ZnO mole ratio is in the range 1.7:1 to 2.3:1.

5. A phosphate glass in accordance with claim 1 which additionally contains in its composition at least one crystallization promoter selected from the group consisting of 1-5 mole percent zircon, 1-5 mole percent zirconia and 1-15 mole percent alkali metal oxides and mixtures thereof.

6. A phosphate glass in accordance with claim 5 wherein the crystallization promoter selected is 1-5 mole percent zircon.

7. A phosphate glass in accordance with claim 6 wherein the glass additionally contains 0.001-0.1 mole % powdered platinum.

8. A phosphate glass in accordance with claim 6 wherein the glass composition additionally contains 1-15 mole percent alkali metal oxides.

9. A phosphate glass in accordance with claim 1 consisting of $P_2O_5$, SnO and ZnO.

10. A phosphate glass in accordance with claim 1 which contains a seal adherence promoter selected from the group consisting of up to 5 mole % $WO_3$, up to 5 mole % $MoO_3$ and up to 0.10 mole % Ag metal.

11. A sealing material containing as an active ingredient a lead-free, $SnO-ZnO-P_2O_5$ glass frit, the composition of which, as calculated in mole percent, on an oxide basis, consists essentially of 25-50% $P_2O_5$ plus SnO and ZnO in amounts such that the mole ratio of SnO:ZnO is in the range of 1:1 to 5:1.

12. A sealing material in accordance with claim 11 wherein the $SnO-ZnO-P_2O_5$ glass frit additionally contains in its composition up to 15% total of at least one crystallization promoter selected from the group consisting of 1-5 mole percent zircon, 1-5 mole percent zirconia, 1-15 mole percent alkali metal oxides and a combination of zircon with 0.001-0.01 mole % powdered platinum.

13. A sealing material in accordance with claim 11 additionally containing a seal adherence promoter selected from the group consisting of up to 5 mole % $WO_3$, up to 5 mole % $MoO_3$ and up to 0.10 mole % Ag metal.

14. A sealing material in accordance with claim 11 additionally containing a mill addition having a low coefficient of thermal expansion to reduce the effective coefficient of thermal expansion of the frit in a fusion seal.

15. A sealing material in accordance with claim 14 wherein the mill addition is composed of $\beta$-quartz crystalline particles.

16. A sealing material in accordance with claim 14 wherein the mill addition is composed of particles of a pyrophosphate crystalline material containing at least one cation selected from the group consisting of Mg, Al, As, Co, Fe, Zn and Zr.

* * * * *